(12) United States Patent
Bays et al.

(10) Patent No.: US 10,900,438 B2
(45) Date of Patent: *Jan. 26, 2021

(54) FUEL PRESSURE CONTROL FOR ENGINE FUEL SYSTEMS

(71) Applicant: Cummins, Inc., Columbus, IN (US)

(72) Inventors: Mark N. Bays, Columbus, IN (US); Michael R. Tidwell, Bloomington, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,945

(22) Filed: Apr. 12, 2019

(65) Prior Publication Data

US 2019/0234340 A1    Aug. 1, 2019

Related U.S. Application Data

(63) Continuation of application No. 15/462,373, filed on Mar. 17, 2017, now Pat. No. 10,260,447, which is a continuation of application No. 14/684,780, filed on Apr. 13, 2015, now Pat. No. 9,599,059.

(51) Int. Cl.
| | |
|---|---|
| *F02D 41/40* | (2006.01) |
| *F02D 41/38* | (2006.01) |
| *F02M 63/02* | (2006.01) |

(52) U.S. Cl.
CPC ..... *F02D 41/3863* (2013.01); *F02D 41/3836* (2013.01); *F02D 41/3845* (2013.01); *F02D 41/40* (2013.01); *F02M 63/023* (2013.01); *F02M 63/0225* (2013.01);
(Continued)

(58) Field of Classification Search
CPC .. F02D 41/3863; F02D 41/40; F02D 41/3845; F02D 41/3836; F02D 2200/602; F02D 2200/0404; F02D 2200/0602; F02M 63/0225; F02M 63/023; Y02T 10/44
USPC ............... 123/447, 456, 457, 510, 511, 497; 701/103–105
See application file for complete search history.

(56) References Cited

U.S. PATENT DOCUMENTS

| | | |
|---|---|---|
| 6,814,059 B2 | 11/2004 | Ito et al. |
| 7,661,411 B2 * | 2/2010 | Kotou ................... F02D 41/008 123/478 |
| 7,806,106 B2 | 10/2010 | Cinpinski et al. |

(Continued)

*Primary Examiner* — Hai H Huynh
(74) *Attorney, Agent, or Firm* — Foley & Lardner LLP

(57) ABSTRACT

An apparatus includes an input module structured to interpret a fuel pressure command indicative of a target fuel pressure within an accumulator and a target fuel injection characteristic, a pump module structured to control a pump assembly to provide fuel to the accumulator to maintain the target fuel pressure within the accumulator, an injector module structured to control a plurality of fuel injectors to inject fuel into an engine based on the target fuel injection characteristic, a pressure module structured to interpret pressure data regarding an actual fuel pressure within the accumulator and to determine a pressure difference between the target fuel pressure and the actual fuel pressure, and a modulation module structured to determine a final fuel injection command responsive to the pressure difference exceeding a first magnitude threshold where the final fuel injection command is based on the pressure difference and the target fuel injection characteristic.

20 Claims, 6 Drawing Sheets

(52) U.S. Cl.
 CPC ........... *F02D 2200/0404* (2013.01); *F02D 2200/0602* (2013.01); *F02D 2200/602* (2013.01); *Y02T 10/40* (2013.01)

(56) References Cited

U.S. PATENT DOCUMENTS

| | | |
|---|---|---|
| 7,980,120 B2 | 7/2011 | Cinpinski et al. |
| 7,987,704 B2 | 8/2011 | Lucido et al. |
| 8,511,275 B2 | 8/2013 | Nistler et al. |
| 9,512,800 B2 * | 12/2016 | Smith .................. F02D 41/3845 |
| 9,599,059 B2 * | 3/2017 | Bays .................. F02D 41/3836 |
| 10,260,447 B2 * | 4/2019 | Bays .................. F02D 41/3836 |
| 2003/0084871 A1 * | 5/2003 | Uchiyama ............. F02D 41/221 |
| | | 123/339.15 |
| 2018/0023501 A1 * | 1/2018 | Ottikkutti ........... F02D 41/3845 |
| | | 123/456 |

\* cited by examiner

FUEL PRESSURE CONTROL FOR ENGINE FUEL SYSTEMS

CROSS-REFERENCE TO RELATED PATENT APPLICATIONS

This application is a continuation of U.S. patent application Ser. No. 15/462,373 filed Mar. 17, 2017, which is a continuation of U.S. patent application Ser. No. 14/684,780 filed Apr. 13, 2015, now U.S. Pat. No. 9,599,059, both of which are incorporated herein by reference in their entireties and for all purposes.

BACKGROUND

Engine fuel systems provide fuel to an engine from a fuel storage system. Generally, the amount of fuel provided to the engine is regulated using a fuel valve coupled to a fuel pump. Among other functions, fuel control systems are used to control the fuel pressure in an accumulator before the fuel is injected into an internal combustion engine. Fuel control systems are used to maintain a desired fuel pressure in an accumulator by actuating a fuel valve within an acceptable tolerance with respect to a desired fuel pressure for a given operating condition (e.g., engine power, engine speed, vehicle speed, etc.). However, problems may arise when a fuel control system is applied in a condition where the capacity of the pump is less than the amount of fuel being demanded by the engine.

SUMMARY

One embodiment relates to an apparatus. The apparatus includes an input module, a pump module, an injector module, a pressure module, and a modulation module. The input module is structured to interpret a fuel pressure command indicative of a target fuel pressure within an accumulator and a target fuel injection characteristic. The pump module is structured to control a pump assembly to provide fuel to the accumulator to maintain the target fuel pressure within the accumulator. The injector module is structured to control a plurality of fuel injectors to inject fuel into an engine based on the target fuel injection characteristic. The pressure module is structured to interpret pressure data regarding an actual fuel pressure within the accumulator and to determine a pressure difference between the target fuel pressure and the actual fuel pressure. The modulation module is structured to determine a final fuel injection command responsive to the pressure difference exceeding a first magnitude threshold. The final fuel injection command is based on the pressure difference and the target fuel injection characteristic.

Another embodiment relates to a method. The method includes receiving, by an input device, a fuel pressure command indicative of a target fuel pressure within an accumulator and a target fuel injection characteristic. The method further includes controlling, by a controller, a pump assembly to provide fuel to the accumulator to maintain the target fuel pressure within the accumulator. The method further includes controlling, by the controller, a plurality of fuel injectors to inject fuel into an engine based on the target fuel injection characteristic. The method further includes interpreting, by the controller, pressure data regarding an actual fuel pressure within the accumulator. The method further includes determining, by the controller, a pressure difference between the target fuel pressure and the actual fuel pressure. The method further includes modulating, by the controller, a final fuel injection command responsive to the pressure difference exceeding a first magnitude threshold for a duration of time greater than a time threshold.

Another embodiment relates to a system. The system includes an engine, an accumulator, a pump assembly, a pressure sensor, and a controller. The accumulator is structured to provide fuel to a plurality of fuel injectors, and the plurality of fuel injectors are structured to inject fuel into the engine. The pump assembly is structured to provide the fuel to the accumulator. The pressure sensor is communicably coupled to the accumulator and structured to monitor an actual fuel pressure within the accumulator. The controller is communicably coupled to the pump assembly, the pressure sensor, and the plurality of injectors. The controller is structured to interpret a fuel pressure command indicative of a target fuel pressure within the accumulator and a target fuel injection characteristic; control the pump assembly to provide fuel to the accumulator to maintain the target fuel pressure within the accumulator; control the plurality of fuel injectors to inject fuel into the engine based on the target fuel injection characteristic; determine a pressure difference between the target fuel pressure and the actual fuel pressure within the accumulator; and determine a final fuel injection command responsive to the pressure difference exceeding a first magnitude threshold for a duration of time greater than a time threshold. The final fuel injection command is based on the pressure difference and the target fuel injection characteristic.

These and other features, together with the organization and manner of operation thereof, will become apparent from the following detailed description when taken in conjunction with the accompanying drawings.

DETAILED DESCRIPTION

Figure 1:
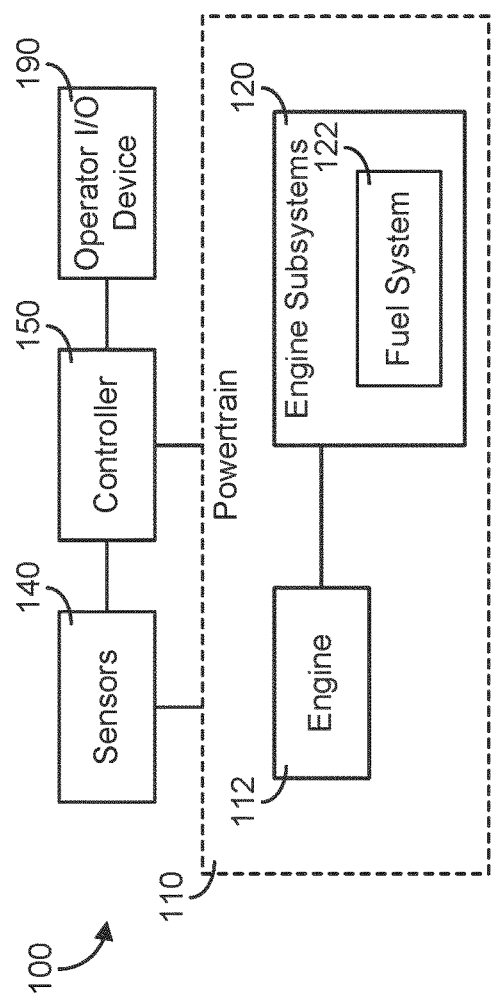
FIG. 1 is a schematic diagram of an engine system with a controller, according to an example embodiment.

Following below are more detailed descriptions of various concepts related to, and implementations of, methods, apparatuses, and systems for controlling fuel pressure in engine fuel systems. The various concepts introduced above and discussed in greater detail below may be implemented in any of numerous ways, as the described concepts are not limited to any particular manner of implementation. Examples of specific implementations and applications are provided primarily for illustrative purposes.

Referring to the figures generally, systems and methods are shown for controlling fuel pressure in engine fuel systems. Fuel control systems are used to maintain the fuel pressure in an accumulator at a target pressure within an acceptable tolerance for a given operating condition. For example, the target pressure may be based on engine power, engine speed, vehicle speed, and so on. However, problems arise when the capacity of a fuel pump sub-system is less than the amount of fuel being demanded by the injectors (and also taking into account any system leakage). For example, several mechanical issues may result when the fuel system is unable to reach a target fuel pressure even when the fuel control system has modulated a high pressure pump control valve to a full pumping position. In one scenario, a low pressure pump (LPP) (e.g., including a mechanical pressure regulating valve) is not able to pump as much fuel as the injectors are commanded to inject. Some of the causes for this may include insufficient sizing of the LPP and cavitation of the LPP due to excessive inlet restriction. Another scenario occurs when a HPP is not able to pump as much fuel as the injectors are being commanded to inject. This may be caused by insufficient sizing of the HPP and internal leakage of the HPP due to degradation.

In some situations, operating a fuel pump in a condition where the injected fuel quantity command is greater than the fuel system's mechanical ability to deliver fuel may result in the fuel pressure dropping to a low pressure point in which the fuel injectors may intermittently fail to open. For example, the low pressure point may typically be on the order of 1/10 of the target fuel pressure provided to an accumulator (e.g., fuel manifold coupled to the engine, etc.). Various undesirable side effects may arise from such a low fuel pressure situation, such as the intermittent failure to inject fuel, which may cause rough running (e.g., poor engine performance, knocking, etc.). Typically, substantially low fuel pressure also causes poor combustion resulting in high exhaust smoke and undesirable emission levels. Low fuel pressure may also result in a very long injection duration, which may cause fuel wetting of the cylinder wall leading to a fuel in oil condition. These mechanical issues, caused by low fuel pressures, may result in progressive damage to the engine or other associated components, such as an associated aftertreatment system.

Pre-existing approaches to correct for the variance in the capacity of the fuel pump sub-system by correcting the amount of fuel being demanded by fuel injectors apply a fixed torque derate using engine protection control features whenever an excessive fuel pressure error/difference is observed. Some of the undesirable effects of these pre-existing approaches include: (i) the applied derate may be greater than required, resulting in the end user experiencing less power than needed; (ii) the applied derate may be less than required, resulting in a fuel pressure below a desired tolerance; and (iii) when the derate is effective, it eliminates the low pressure condition which in turn causes the derate to be removed, once again causing a low pressure condition (i.e., resulting in a cyclic effect, etc.). Approaches of the present disclosure modify the design of a fuel pressure controller and/or fuel control system to provide commands not only to the high pressure pump control valve, but also to the fuel injectors. Controlling both the high pressure pump control valve and the fuel injectors allows the controller to better achieve a target fuel pressure where mechanical issues with fuel system hardware result in a mismatch between pump capacity and system fuel rate demand. Further benefits may also decreased chances of causing progressive damage to the engine, engine subsystems, aftertreatment systems, and so on.

Referring now to FIG. 1, a schematic diagram of an engine system 100 with a controller 150 is shown, according to an example embodiment. According to one embodiment, the engine system 100 is embodied within a vehicle. The vehicle may include an on-road or an off-road vehicle including, but not limited to, line-haul trucks, mid-range trucks (e.g., pick-up truck, etc.), sedans, coupes, tanks, airplanes, and any other type of vehicle. In some embodiments, the engine system 100 may be implemented in stationary devices, such as a power generator. All such variations are intended to fall within the spirit and scope of the present disclosure. Further, while FIG. 1 depicts the engine system 100 as including an internal combustion engine 112, the engine system 100 may be powered by another type of power source. For example, the engine system 100 may be a hybrid system or an internal combustion engine powered system as shown. These and other features of the present disclosure are described more fully herein below.

As shown in FIG. 1, the engine system 100 generally includes a powertrain system 110, sensors 140 communicably coupled to one or more components of the engine system 100, a controller 150, and an operator input/output (I/O) device 190. Communication between and among the components of the engine system 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components in the engine system 100 of FIG. 1, the controller 150 may receive data from one or more of the components shown in FIG. 1. For example, the data may include pressure data and/or position data acquired via one or more of the sensors 140. As another example, the data may include an input from operator I/O device 190. As described more fully herein, with this data, the controller 150 modulates the commands provided to at least one of a pump assembly and a plurality of injectors to control fuel pressure.

As shown in FIG. 1, the powertrain system 110 includes an engine 112. The powertrain system 110 may include any type of components typically included in powertrain systems. For example, the powertrain system 110 may also include, but is not limited to, a transmission, a drive shaft, a differential, and a final drive. As a brief overview, in a vehicle implementation, the engine 112 receives a chemical energy input (e.g., a fuel such as gasoline, diesel, natural gas, propane, etc.) and combusts the fuel to generate mechanical energy, in the form of a rotating crankshaft. The transmission receives the rotating crankshaft and manipulates the speed of the crankshaft (i.e., the engine revolutions-per-minute (RPM), etc.) to affect a desired drive shaft speed. The rotating drive shaft is received by the differential, which provides the rotational energy of the drive shaft to the final drive. The final drive then propels or moves the vehicle.

The engine 112 may be structured as any internal combustion engine (e.g., compression-ignition, spark-ignition, etc.), such that it may be powered by any fuel type (e.g., diesel, ethanol, gasoline, etc.). Similarly, the transmission may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmissions, etc.), the transmission can include a variety of settings (gears, for a geared transmission) that affect different output speeds based on the engine speed. Like the engine 112 and the transmission, the drive shaft, differential, and final drive may be structured in any configuration dependent on the application (e.g., the final drive is structured as wheels in an automotive application and a propeller in an airplane application, etc.). Further, the drive shaft may be structured as any type of drive shaft including, but not limited to, a one-piece, a two-piece, and a slip-in-tube driveshaft based on the application.

The engine system 100 is also shown to include engine subsystems 120 coupled to the engine 112. The engine subsystems 120 may include both electrically-powered engine accessories and engine driven accessories, as well any other type of subsystem in the engine system 100. For example, the engine subsystems 120 may include an exhaust aftertreatment system. The exhaust aftertreatment system may include any component used to reduce exhaust emissions (e.g., diesel exhaust emissions, gas exhaust emissions, etc.), such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor, etc.). Furthermore, various accessories may include, but are not limited to, air compressors (for pneumatic devices), air conditioning systems, power steering pumps, engine coolant pumps, fans, and the like.

As shown in FIG. 1, the engine system 100 includes a fluid system, shown as fuel system 122. By way of example, the fluid system may be structured as any type of fluid system included with the engine system 100, or in certain embodiments, a vehicle. Thus, the fluid system may be structured to receive fluids such as oil, fuel, air, transmission fluid, hydraulic fluid, or any other fluid which may need to be filtered within the engine system 100. In one embodiment, the fluid system is structured as an oil filter system that filters oil within the engine 112 and its various components to remove possible debris and particulates. For example, lubricating fluid (e.g., engine oil, etc.) may be used to reduce wear on the engine 112, carry away heat from the engine 112, clean the engine 112, and the like. However, debris and particles in the oil add friction to components—as compared to lubrication—which may deteriorate performance of such components. In one embodiment, a filtering element may be included and structured to remove or substantially remove unwanted debris and particles from the fluid.

In some embodiments, the fluid system may be included with a coolant system (e.g., attached to a radiator of a vehicle, etc.). In each of the aforementioned embodiments, the fluid system described herein may be utilized. Accordingly, while the description provided herein substantially relates to fuel systems, it will be understood that the fluid system may be utilized with many other types of fluids (e.g., oil, hydraulic fluid, coolant, etc.) with all such embodiments intended to be within the spirit and scope of the present disclosure.

Figure 2:
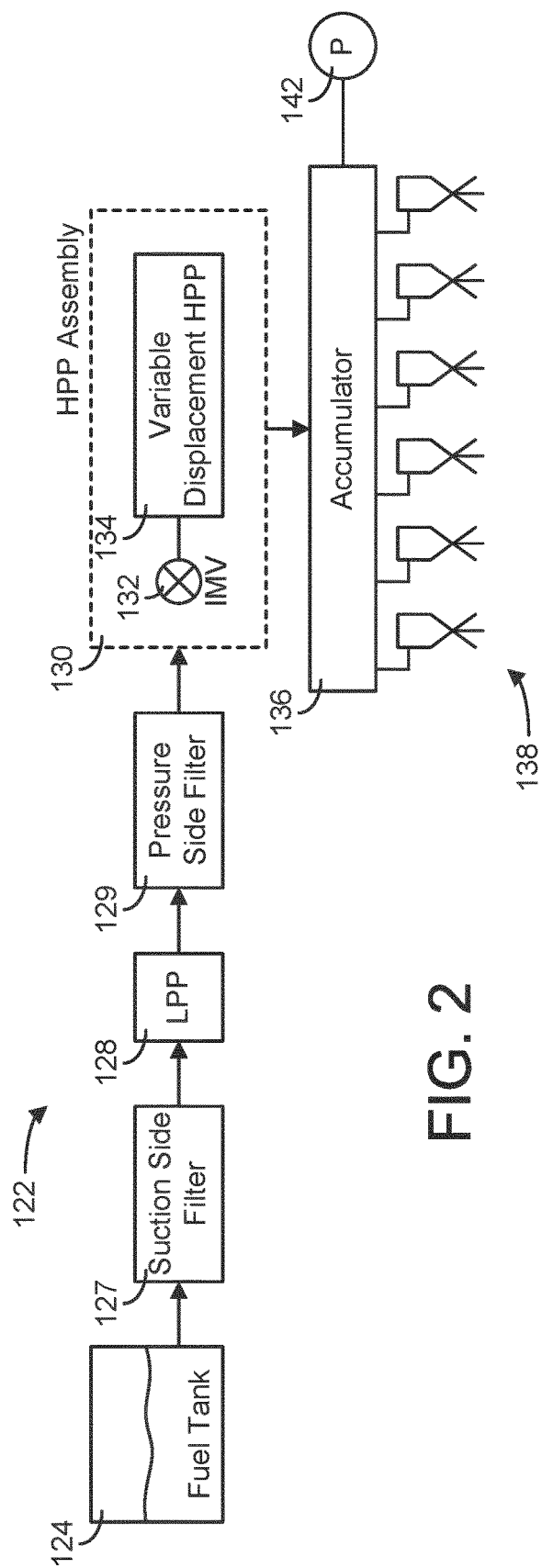
FIG. 2 is a more detailed schematic diagram of the fuel system of FIG. 1, according to an example embodiment.

According to the example embodiment shown in FIG. 2, the fluid system is structured as a fuel system 122 for the engine system 100. In one embodiment, the fuel system 122 is a high pressure common rail fuel system. In some embodiments, the fuel system 122 is a different type of fuel system. As shown in FIG. 2, the fuel system 122 receives fuel (e.g., diesel, gasoline, propane, natural gas, etc.) from a fuel source such as a fuel storage tank, shown as fuel tank 124. Unfiltered fuel from the fuel tank 124 may contain several kinds of contamination and/or foreign materials (e.g., paint chips, dirt, rust, etc.). If the contaminates are not substantially removed prior to the fuel entering the engine 112, rapid wear of the components of the fuel system 122 and/or components of the engine 112 may result. In some embodiments, the fuel system 122 includes a first filtering element, shown as suction side filter 127. The suction side filter 127 is structured to perform a first filtering operation to substantially remove contaminants from the unfiltered fuel. The suction side filter 127 may be a semi-permeable filter paper that filters and collects contaminants or debris (e.g., solids, etc.). In some embodiments, the suction side filter 127 may be structured as any type of filter media with any porosity and grade depending on the application.

As shown in FIG. 2, in some embodiments, the suction side filter 127 is in fluid communication with a first pump, shown as low pressure pump (LPP) 128. The LPP 128 is structured to receive filtered fuel from the suction side filter 127. The LPP 128 is configured to lift (e.g., suction, etc.) fuel from the fuel tank 124 and draw the fuel through the suction side filter 127 to facilitate the filtering of the fuel. In one embodiment, the LPP 128 is a gear type pump. In some embodiments, the LPP 128 includes an internal pressure regulator (e.g., a spring mechanical pressure regulating valve, a recirculating type mechanical regulator valve, etc.). The internal pressure regulator is configured to open when a pressure of the fuel exceeds (e.g., is greater than, etc.) a pressure threshold and to regulate the outlet pressure at a substantially constant pressure. The LPP 128 is capable of pumping the fuel at a relatively low pressure (e.g., less than 20 bar, etc.), sufficient to transfer the fuel from the fuel tank 124 to a high pressure pump (HPP) assembly, shown as HPP assembly 130. In some embodiments, prior to reaching the HPP assembly 130, the fuel passes through a second filter, shown as pressure side filter 129. The pressure side filter 129 is structured to substantially remove any remaining contaminants from the already filtered fuel. The pressure side filter 129 may be a semi-permeable filter paper that filters and collects contaminants or debris (e.g., solids, etc.). In some embodiments, the pressure side filter 129 may be structured as any type of filter media with any porosity and grade depending on the application. In one embodiment, the pressure side filter 129 is substantially similar to the suction side filter 127. In some embodiments, the pressure filter 129 has a finer grade than the suction side filter 127 to perform a second filtering operation. The second filtering operation facilitates the removal of finer particles and contaminants from the fuel flow that may have passed through the suction side filter 127.

As shown in FIG. 2, following the second filtering operation, the relatively low pressure fuel is introduced to the HPP assembly 130. The HPP assembly 130 is configured to provide a fuel flow at a target fuel pressure to a manifold, shown as accumulator 136, of the engine 112 based on the current demands of the engine 112 (e.g., engine power, engine torque, engine speed, vehicle speed, etc.). As shown in FIG. 2, the HPP assembly 130 may include an inlet metering valve (IMV) 132 and a second pump, shown as high pressure pump (HPP) 134. The IMV 132 is configured to regulate an amount/quantity of fuel to the HPP 134. In some embodiments, the IMV 132 is controlled by the controller 150 such that signals/commands from the controller 150 modulate the amount of fuel allowed into the HPP assembly 130 through the IMV 132 (i.e., as well as the amount of fuel allowed to exit the HPP assembly 130, etc.). The HPP 134 is configured to pressurize the fuel flowing from the IMV 132 to a target fuel pressure suitable for direct injection into the engine 112. The target fuel pressure may be up to or even greater than 2,000 bar (i.e., substantially greater than the pressure provided by the LPP 128, etc.). In one embodiment, the HPP 134 is structured as a variable displacement high pressure pump. The variable displacement is provided through control of the amount of fuel flow through the IMV 132.

Referring still to FIG. 2, the pressurized fuel flow exiting the HPP 134 travels to the accumulator 136. The accumulator 136 is in fluid communication with the HPP assembly 130 and is structured to couple the HPP assembly 130 to a plurality of fuel injectors 138. In one embodiment, each of the plurality of fuel injectors 138 is associated with a cylinder of the engine 112. For example, a six cylinder engine may include six fuel injectors 138. In some embodiments, a cylinder of the engine 112 may include more than one injector 138 (e.g., two fuel injectors 138, etc.). The plurality of fuel injectors 138 are configured to inject the pressurized fuel flow into each cylinder of the engine 112 at an appropriate time (e.g., corresponding with the ignition cycle of each cylinder, etc.) and pressure to provide the engine 112 with a finely atomized injected fuel that facilitates combustion within each cylinder of the engine 112. In one embodiment, the fuel injectors 138 are electrically controlled such that the controller 150 modulates injection characteristics (e.g., an amount of fuel, a pressure of fuel, a fuel flow rate, etc.) of the fuel injected into the cylinders of the engine 112 via the fuel injectors 138. By varying the injection characteristics of the fuel injected into the engine, the controller 150 may control various performance characteristics of the engine 112 (e.g., engine power, engine torque, engine speed, etc.).

Referring back to FIG. 1, the operator I/O device 190 enables an operator of the engine system 100 to communicate with the engine system 100 and the controller 150. For example, the operator I/O device 190 may include, but is not limited to, an interactive display, a touchscreen device, one or more buttons and switches, voice command receivers, etc. In one embodiment, the operator I/O device 190 includes an accelerator pedal and/or a throttle. The accelerator pedal and/or throttle are configured to provide commands to the engine 112 and/or the controller 150 regarding a desired engine output (e.g., engine speed, engine power, etc.). The desired engine output may be based on the position of the pedal or throttle (e.g., full throttle, half throttle, etc.) which corresponds with a fuel pressure command regarding the target fuel pressure provided by the fuel system 122 to the engine 112. The operator of the engine system 100 may also use the operator I/O device 190 to define a command limit, an authority limit, a magnitude threshold, a time threshold, and a respite threshold for the engine system 100, which are each described more fully herein.

Referring now to FIGS. 1-2, the engine system 100 includes one or more sensors 140. The sensors 140 are configured to measure, determine, estimate, etc., and transmit various data regarding the engine 112 and the fuel system 122 to the controller 150. As shown in FIG. 2, the sensors 140 include a pressure transducer, shown as pressure sensor 142. The pressure sensor 142 is configured to measure a fuel pressure of the fuel flow leaving the HPP assembly 130. As shown in FIG. 2, the pressure sensor 142 is coupled to the accumulator 136 and configured to measure the fuel pressure within the accumulator 136. In some embodiments, the pressure sensor 142 is located elsewhere between the outlet of the HPP assembly 130 and the fuel injectors 138. By way of example, the sensors 140 may also include a position sensor configured to measure position data regarding the position of the accelerator pedal or throttle. By way of another example, the sensors 140 may include an engine speed sensor configured to measure speed data regarding the speed of the engine 112 and/or a vehicle (if in a vehicle embodiment).

As the components of FIGS. 1-2 are shown to be embodied in an engine system 100, in one embodiment the controller 150 may be embodied as add-on to an electronic control module (ECM). In some embodiments, the controller 150 may be a stand-alone tool that performs all required data logging, data tracking, data analysis, etc. needed to control the fuel system 122. In some embodiments, the controller 150 is included in the ECM. The ECM may also include a transmission control unit and any other vehicle control unit (e.g., exhaust aftertreatment control unit, powertrain control module, engine control module, etc.). The controller 150 may be configured to accept inputs to measure accumulator pressure along with other inputs necessary to control other aspects of the engine function such as accelerator pedal position, engine speed, vehicle speed, etc. The controller 150 may include control algorithm software and tuning values to achieve desired engine and vehicle system operation. In some embodiments, the controller 150 uses the software and tuning to determine electrical output signals provided to the IMV 132 and the fuel injectors 138. The function and structure of the controller 150 is described in greater detail in FIG. 3.

Figure 3:
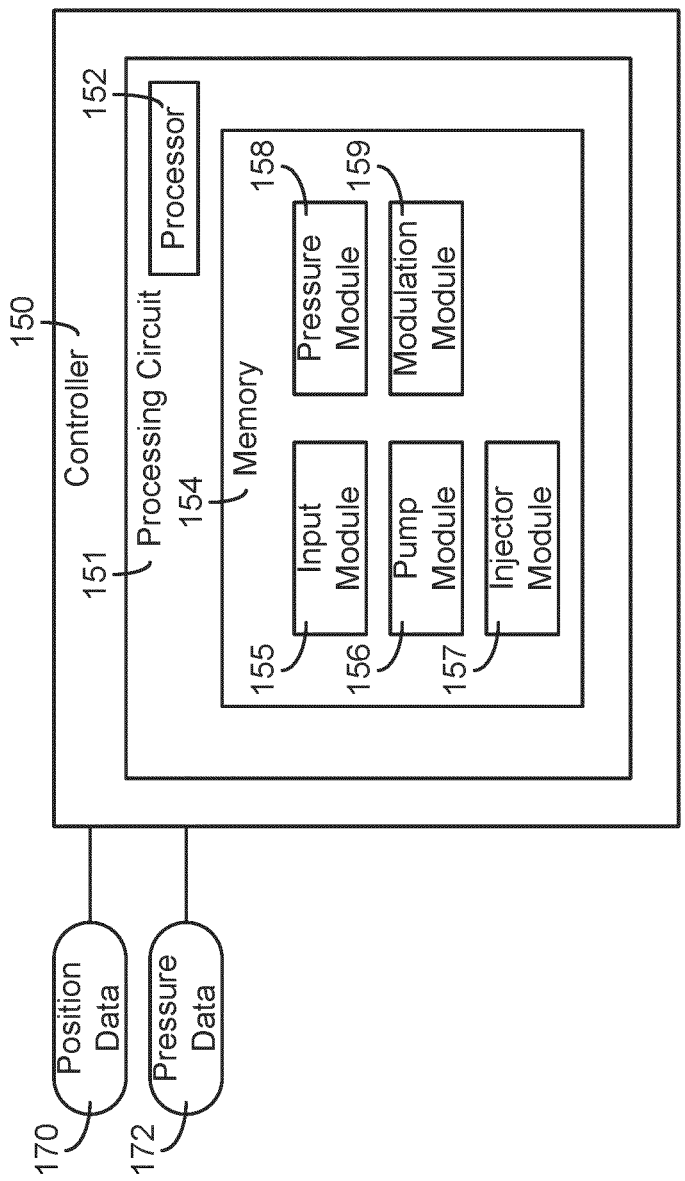
FIG. 3 is a more detailed schematic diagram of the controller of FIG. 1, according to an example embodiment.

Referring now to FIG. 3, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. In some embodiments, the one or more memory devices 154 may include database components, object code components, script components, or any other type of information structure for supporting the various activities and information structures described herein.

The memory 154 is shown to include various modules for completing processes described herein. More particularly, the memory 154 includes modules configured to control the IMV 132 and/or the fuel injectors 138 of the fuel system 122 responsive to pump capacity and system demands (e.g., fuel pressure, engine power, etc.). While various modules with particular functionality are shown in FIG. 3, it will be understood that the controller 150 and memory 154 may include any number of modules for completing the functions described herein. For example, the activities of multiple modules may be combined as a single module and additional modules with additional functionality may be included. Further, it will be understood that the controller 150 may further control other processes beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 3, the controller 150 includes an input module 155, a pump module 156, an injector module 157, a pressure module 158, and a modulation module 159. The input module 155 is structured to receive a fuel pressure command regarding a target fuel pressure. The target fuel pressure is provided to the accumulator 136 such that the fuel injectors 138 may inject fuel into the cylinders of the engine 112 with certain injection characteristics (e.g., an amount of fuel, a pressure of fuel, a fuel flow rate, etc.) based on the fuel pressure command. The input module 155 may be communicably coupled to the operator I/O device 190 and/or one or more sensors 140. The input module 155 is structured to receive one or more inputs from an operator of the engine system 100. In one embodiment, the input module 155 is structured to receive position data 170 from a position sensor. As described above, the operator I/O device 190 may include an accelerator pedal or throttle. The position sensor is configured to measure the position data 170 regarding the position of the accelerator pedal or throttle. The position of the accelerator pedal or throttle corresponds with a desired engine performance (e.g., engine power, engine torque, etc.) from the engine 112. The desired engine performance corresponds with a required fuel flow/pressure into the engine 112 to provide the desired engine performance. In some embodiments, the required fuel flow/pressure corresponds with a pressure command. In some embodiments, the position data 170 provides the controller 150 with a fuel pressure command regarding a target fuel pressure to be provided by the fuel system 122 to the engine 112. The pressure command received by the input module 155 may be transmitted to the pump module 156.

The input module 155 may be further structured to receive the command limit and the authority limit which may be used by other modules of the controller 150. The command limit may define a maximum parameter for the engine system 100 including at least one of a maximum fuel injection duration, a maximum amount of fuel injected, a maximum fuel flow rate through the fuel injectors 138, a maximum engine power, and a maximum engine torque. The authority limit may define a minimum parameter for the engine system 100 including at least one of a minimum fuel injection duration, a minimum amount of fuel injected, a minimum fuel flow rate through the fuel injectors 138, a minimum engine power, and a minimum engine torque. The input module 155 may be further structured to receive the magnitude threshold and the time threshold. The magnitude threshold defines a maximum pressure difference/error between a target fuel pressure and a measured fuel pressure within the fuel system 122. The time threshold may define a maximum time duration at which the magnitude threshold may exceed before the controller 150 implements the fuel pressure control methods described herein. For example, the magnitude threshold may be 250 bar and the time threshold 3 minutes such that if the pressure difference is greater than 250 bar (e.g., 275 bar, etc.) for at least 3 minutes (e.g., 3 minutes, 3.5 minutes, 4 minutes, etc.), the controller 150 adjusts the fuel pressure. In one embodiment, the command limit, the authority limit, the magnitude threshold, the time threshold, and/or the respite threshold are predefined and stored within the controller 150 based on a characteristic of the engine 112. In some embodiments, the command limit, the authority limit, the magnitude threshold, the time threshold, and/or the respite threshold are defined by an operator of the engine system 100 via the operator I/O device 190. The function/purpose of the command limit, the authority limit, the magnitude threshold, the time threshold, and the respite threshold are described more fully herein.

The pump module 156 is structured to control the HPP assembly 130 to provide a fuel flow to the accumulator 136 at the target fuel pressure responsive to the fuel pressure command. The pump module 156 interprets the fuel pressure command to determine the target fuel pressure. In one embodiment, the pump module 156 uses a look-up table to determine the target fuel pressure based on the fuel pressure command. For example, the pump module 156 correlates the position of the accelerator pedal or throttle with a target fuel pressure (e.g., 50% throttle may correlate with a target fuel pressure of 1,500 bar, 100% throttle may correlate with a target fuel pressure of 2,000 bar, etc.). In some embodiments, the pump module 156 determines the target fuel pressure via another method (e.g., an algorithm, an equation, etc.). In one embodiment, the pump module 156 provides the fuel flow to the accumulator 136 at the target fuel pressure by controlling the fuel flow through the IMV 132.

The injector module 157 is structured to provide a fuel injection command to the plurality of fuel injectors 138 regarding target injection characteristics of the fuel injected into each cylinder of the engine 112 responsive to the fuel pressure command. For example, the pressure command may define a desired performance characteristic of the engine 112 (e.g., engine power/torque, etc.). The injector module 157 may control the injection characteristics of the fuel to facilitate the ability of the engine system 100 to reach the desired performance characteristics. The injection characteristics may include at least one of a fuel flow rate, a fuel injection duration, and an injected amount of fuel into the cylinders of the engine 112 to facilitate reaching the desired performance characteristic of the engine 112. The injector module 157 may determine the target injection characteristics of fuel using a look-up table, an equation, an algorithm, and the like based on the fuel pressure command.

The pressure module 158 is structured to acquire pressure data 172 regarding a fuel pressure of the fuel flow within the accumulator 136. In some embodiments, the pressure module 158 is communicably coupled to the pressure sensor 142 and configured to receive the pressure data 172 measured by the pressure sensor 142. As described above, the pressure data 172 may include the measured fuel pressure within the accumulator 136. The pressure module 158 is configured to determine a pressure difference/error between the target fuel pressure and the measured fuel pressure. As shown in FIGS.

4A-4B, the pressure module 158 stores a history of the pressure differences over time, as shown by pressure difference graph 400. In one embodiment, the pressure module 158 continually monitors the pressure difference between the target fuel pressure and the measured fuel pressure. In some embodiments, the pressure module 158 determines the fuel pressure difference based on a predefined schedule (e.g., every minute of operation, every mile driven, etc.).

Figure 4A:
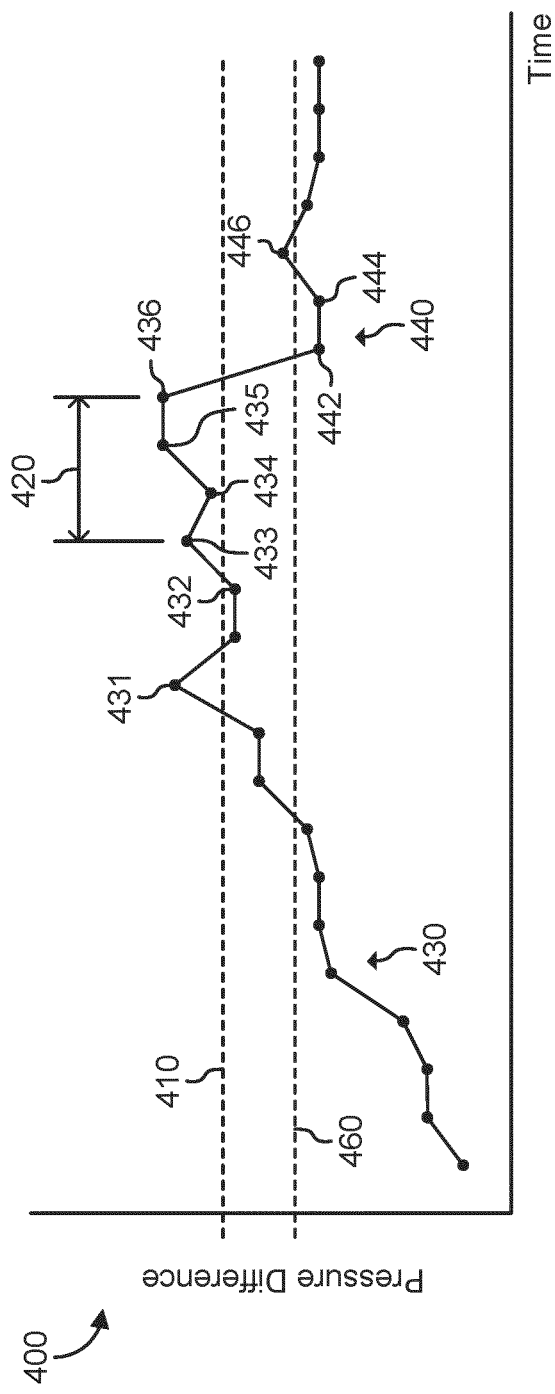
FIG. 4A is a graphical representation of pressure differences between a target fuel pressure and a measured fuel pressure over time, according to an example embodiment.
Figure 4B:
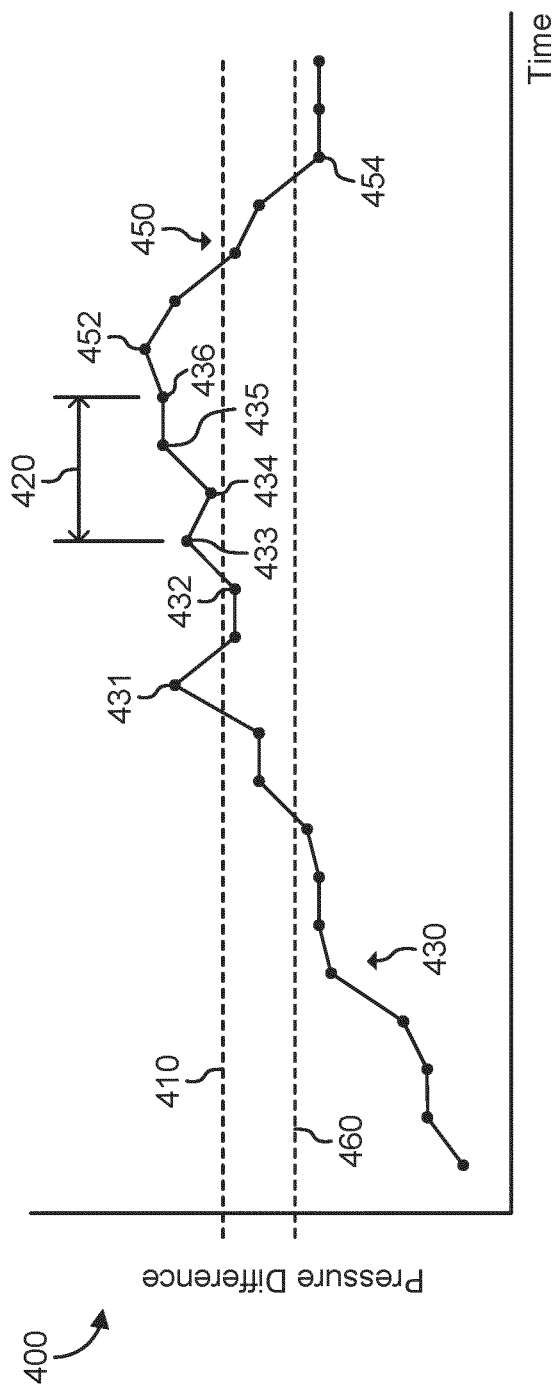
FIG. 4B is a graphical representation of pressure differences between a target fuel pressure and a measured fuel pressure over time, according to another example embodiment.

As shown in FIGS. 4A-4B, a first portion 430 of the pressure difference graph 400 shows that a pressure difference being below a magnitude threshold 410 (e.g., a maximum pressure difference, etc.) up through data point 431. As described above, the magnitude threshold 410 may be operator defined or predefined within the controller 150. The data point 431 represents the first point in which the pressure difference between the target fuel pressure and the measured fuel pressure exceeds (e.g., is greater than, etc.) the magnitude threshold 410. By way of example, the magnitude threshold 410 may vary for different engine systems 100 and operating conditions (e.g., altitude, external temperature, etc.). According to an example embodiment, the magnitude threshold 410 is a 250 bar pressure difference between the target fuel pressure and the measured pressure. In some embodiments, the magnitude threshold 410 is greater than or less than 250 bar (e.g., 200 bar, 300 bar, etc.).

In some embodiments, when the pressure difference is greater than the magnitude threshold 410, the pressure module 158 determines whether the pressure difference remains above the magnitude threshold for a duration of time, shown as time threshold 420. This may substantially prevent the controller 150 form taking action prematurely. For example, the controller 150 may determine whether the pressure difference is stabilizing above the magnitude threshold 410 or if the data point 431 is a random variation or anomaly in the pressure data 172. In one embodiment, the time threshold 420 is three minutes. In some embodiments, the time threshold 420 is greater than or less than three minutes (e.g., two minutes, five minutes, etc.). In some embodiments, the time threshold 420 is replaced or supplemented by a distance threshold. For example, the pressure difference may be monitored for exceeding (e.g., remaining above, being greater than, etc.) the magnitude threshold 410 over a distance of travel (e.g., one mile, three miles, etc.) in a vehicle embodiment.

As shown in FIGS. 4A-4B, from data point 433 through data point 436, the first portion 430 of the pressure difference graph 400 remains above the magnitude threshold 410 for a duration of time that meets the time threshold 420. This represents that the traditional control method of only controlling the IMV 132 of the HPP assembly 130 may not be sufficient in some circumstances. Therefore, the controller 150 may need to take further action to reduce the pressure difference between the measured pressure and the target pressure.

Referring now to FIGS. 4A-5B, prior to both the magnitude threshold 410 and the time threshold 420 being exceeded, the controller 150 implements a target or initial fuel injection command limit 510. In one embodiment, the target fuel injection command limit 510 is predefined or set by an operator of the engine system 100 to be substantially high (e.g., as a ratio as compared to the fuel pressure command, etc.) such that it does not interfere with or provide the opportunity of interfering with normal operation of the engine system 100. In some embodiments, the command limit 510 is set at a maximum based on specific design parameters of the engine system 100 (e.g., power rating, torque rating, speed rating, air to fuel ratio, etc.). As described herein, the command limit may include at least one of a maximum fuel injection duration, a maximum amount of fuel injected, a maximum fuel flow rate through the fuel injectors 138, a maximum engine power, a maximum engine torque, etc. At data point 436, the first portion 430 of the pressure difference graph 400 (i.e., the pressure difference, etc.) is greater than the magnitude threshold 410 for a duration of time that is equal to or greater than the time threshold 420.

Referring to FIGS. 2 and 4A-5B, the modulation module 159 may be structured to control the fuel injection command provided to the plurality of fuel injectors 138 and/or the fuel flow through the IMV 132 responsive to the pressure difference between the target fuel pressure and the measured fuel pressure within the accumulator 136 being greater than the magnitude threshold for a duration of time that is at least equal to the time threshold. The modulation module 159 may be further structured to redefine the fuel injection command limit 510 based on the pressure difference being greater than the magnitude threshold 410 for a duration of time that is at least equal to the time threshold 420. In some embodiments, the command limit 510 may relate or refer to the fuel injection amount, the fuel pressure command, or other fuel pressure/ignition parameter. In some embodiments, the command limit 510 is redefined to command limit 530 based on the fuel injection command provided by the injection module 157 to the fuel injectors 138 at data point 432. The data point 432 represents the time at which the last fuel injection command that facilitated a pressure difference less than the magnitude threshold 410 was provided. This provides the modulation module 159 with an educated starting point for the modulation of the fuel injection commands. In one embodiment, the modulation module 159 redefines the fuel injection command limit 510 to a fraction (e.g., linear function, etc.) of the last fuel injection command provided by the injection module 157 that facilitated a pressure difference less than the magnitude threshold 410. For example, in one embodiment, the command limit 530 is set to 90% of the fuel injection command that was provided at the time of data point 432. In some embodiments, the modulation module 159 redefines the fuel injection command limit 510 using a higher order function or look-up table based on the last fuel injection command that facilitated a pressure difference below the magnitude threshold 410.

Figure 5A:
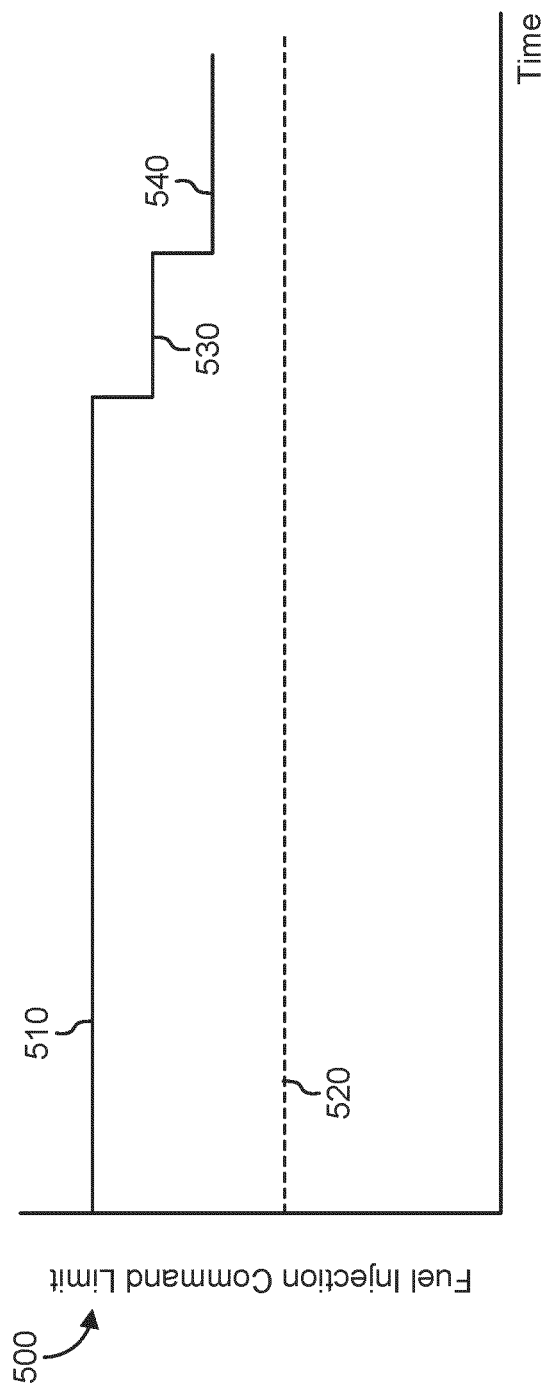
FIG. 5A is a graphical representation of a fuel injection command limit corresponding to the measured fuel pressures of FIG. 4A, according to an example embodiment.

Referring now to FIGS. 4A and 5A, the redefined command limit 530 effectively reduces the pressure difference of a modulated portion 440 of the pressure difference graph 400 below a second magnitude threshold, shown as respite threshold 460, at data point 442. This situation may occur when the last fuel injection command that facilitated a pressure difference less than the magnitude threshold 410 is substantially high (e.g., relatively close to the command limit 510, etc.). For example, a fraction of a substantially high fuel injection command (e.g., 90%, etc.) may be sufficient to reduce the pressure difference such that the initial reduction of the command limit 510 to the redefined command limit 530 reduces the pressure difference below the respite threshold 460. The respite threshold 460 represents a maximum pressure difference that the pressure difference of modulated portion 440 is to fall below before the modulation module 159 keeps the redefined command limit constant (i.e., the modulation module 159 may not decrease the command limit while the pressure difference is less than the respite threshold, the fuel injection command is constant while the pressure difference is less than the respite threshold, etc.). In one embodiment, the respite threshold 460 is a fraction of (i.e., less than, etc.) the magnitude threshold 410 (e.g., 250 bar versus 200 bar, etc.). In some embodiments, the respite threshold 460 is equal to the magnitude threshold 410.

As shown in FIGS. 4A and 5A, the command limit 530 may remain constant until the pressure difference exceeds (e.g., becomes greater than, etc.) the respite threshold 460, as shown at data point 446. In one embodiment, the command limit 530 is redefined to a command limit 540 (e.g., a fraction of the command limit 530, etc.) once the respite threshold 460 is exceeded by the pressure difference based on the injection command at data point 444. In some embodiments, the modulation module 159 waits to redefine the command limit 530 until the time threshold 420 is met once again. In some embodiments, the modulation module 159 waits to redefine the command limit 530 until the pressure difference is once again greater than the magnitude threshold 410 and/or for a duration of time at least equal to the time threshold 420. The command limit 540 may remain constant until the respite threshold 460, or the magnitude threshold 410 and/or the time threshold 410 are exceeded once again. In some embodiments, the respite threshold 460 is reduced such that it is lower than initially set (e.g., from 200 bar to 175 bar, etc.). In some embodiments, the aforementioned process may continue until an authority limit, shown as authority limit 520, is reached (i.e., the command limit is not reduced beyond the authority limit, etc.). In some embodiments, the authority limit 520 represents the minimum permissible fuel injection command limit. The authority limit 520 may be based on specific design parameters of the engine system 100 (e.g., air to fuel ratio, minimum operating characteristics that prevent the engine 112 from reaching a stalling condition, etc.).

Figure 5B:
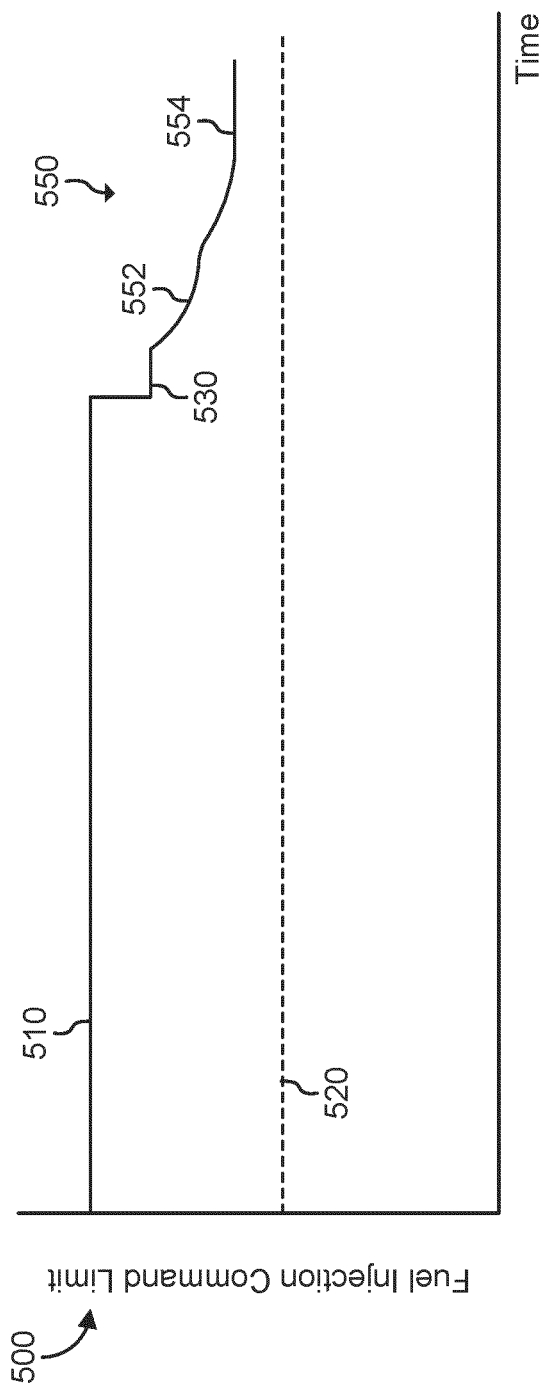
FIG. 5B is a graphical representation of a fuel injection command limit corresponding to the measured fuel pressures of FIG. 4B, according to another example embodiment.

Referring now to FIGS. 4B and 5B, an example is illustrated of the redefined command limit 530 not effectively reducing the pressure difference of a modulated portion 450 of the pressure difference graph 400 below the respite threshold 460. The modulation module 159 is configured to apply a control method at data point 452 to adjust the command limit 530 such that the pressure difference is reduced below the respite threshold 460. In one embodiment, the modulation module 159 implements a single direction integral type control method. In some embodiments, another type of control method is implemented.

During the implementation of the control method, the modulation module 159 adaptively adjusts the command limit 530, shown by command limit 550. The command limit 550 includes a variable portion 552 and a constant portion 554. The variable portion of the command limit 550 is adaptively adjusted such that the modulated portion 450 is reduced below the respite threshold 460, shown at data point 454. In one embodiment, the command limit 550 is adjusted downward (e.g., reduced, etc.) proportional to the pressure difference. In an alternate embodiment, the rate at which the command limit 550 is reduced is based on a schedule from a look-up table. At the data point 454, the variable portion of the command limit 550 is stopped and the command limit 550 becomes constant. If the pressure difference and/or time duration exceed at least one of the respite threshold 460, the magnitude threshold 410, and the time threshold 420, the command limit 550 may again be adaptively adjusted using the control method. This may be continued until the authority limit 520 is reached by the command limit 550. In some embodiments, if the pressure difference once again and/or time duration exceed (e.g., surpass, satisfy, are greater than, etc.) at least one of the respite threshold 460, the magnitude threshold 410, and the time threshold 420, the command limit is redefined before the control method may be re-implemented.

By applying the fuel pressure control with the controller 150 as described above, situations where mechanical problems with fuel system hardware cause a mismatch between pump capacity and demanded flow no longer result in poor fuel pressure control leading to progressive damage to the engine 112 or aftertreatment system. Rather, the controller 150 reduces the maximum pumping demand and keeps the fuel pressure within desired control limits. In practice, the fuel injection command limit is reduced until the limit matches the capacity of the mechanical components of the fuel system 122 (e.g., the HPP assembly 130, the LPP 128, etc.) to deliver fuel to the engine 112. The engine 112 may then operate with this limit without encountering a substantially high fuel pressure error.

According to an example embodiment, when the operator commands the engine 112 to a lightly loaded condition such as idle (e.g., by letting off of the accelerator pedal or throttle, etc.) or during a new engine cycle (e.g., the engine 112 is shut OFF and then back ON, etc.), the fuel injection command limit is rapidly removed (e.g., the initial command limit is reinstated/reset during a release condition, etc.). This enables full power to be available to the engine 112 on the next operation cycle if the mechanical components are able to deliver the required fuel rate at the target fuel pressure. If the required fuel capacity is not available, the controller 150 may once again modulate the fuel injection commands and/or pump commands (e.g., regarding the IMV 132, etc.) in order to provide for operation below a substantial fuel pressure difference (e.g., below the magnitude threshold, etc.). In some embodiments, the final fuel injection command may drop below the authority limit, and the modulation module 159 may be structured to determine that a release condition is met when the final fuel injection command drops a predetermined amount below the authority limit.

In an alternative embodiment, the controller 150 implements the fuel pressure control not only resulting from the fuel pressure difference being greater than a magnitude threshold for a duration of time as least equal to a time threshold, but additionally or alternatively due to the commands provided to the IMV 132 being greater than a threshold for magnitude and duration (i.e., the IMV 132 reaches a saturation condition, etc.). The desired effect is for the controller 150 to trigger the modulation of fuel injection command limit when the commands to the IMV 132 become saturated. For example, the pump commands provided by the controller 150 (i.e., the pump module 156, etc.) may indicate that the IMV 132 is operating at a full operating condition (e.g., a 5 Volt signal for more than 5 seconds, etc.). In this example, the controller 150 may begin modulating the fuel injection command limit to compensate for the mechanical limitations of the fuel system 122 (e.g., flow rate through filters 127 and 129, etc.).

Figure 6:
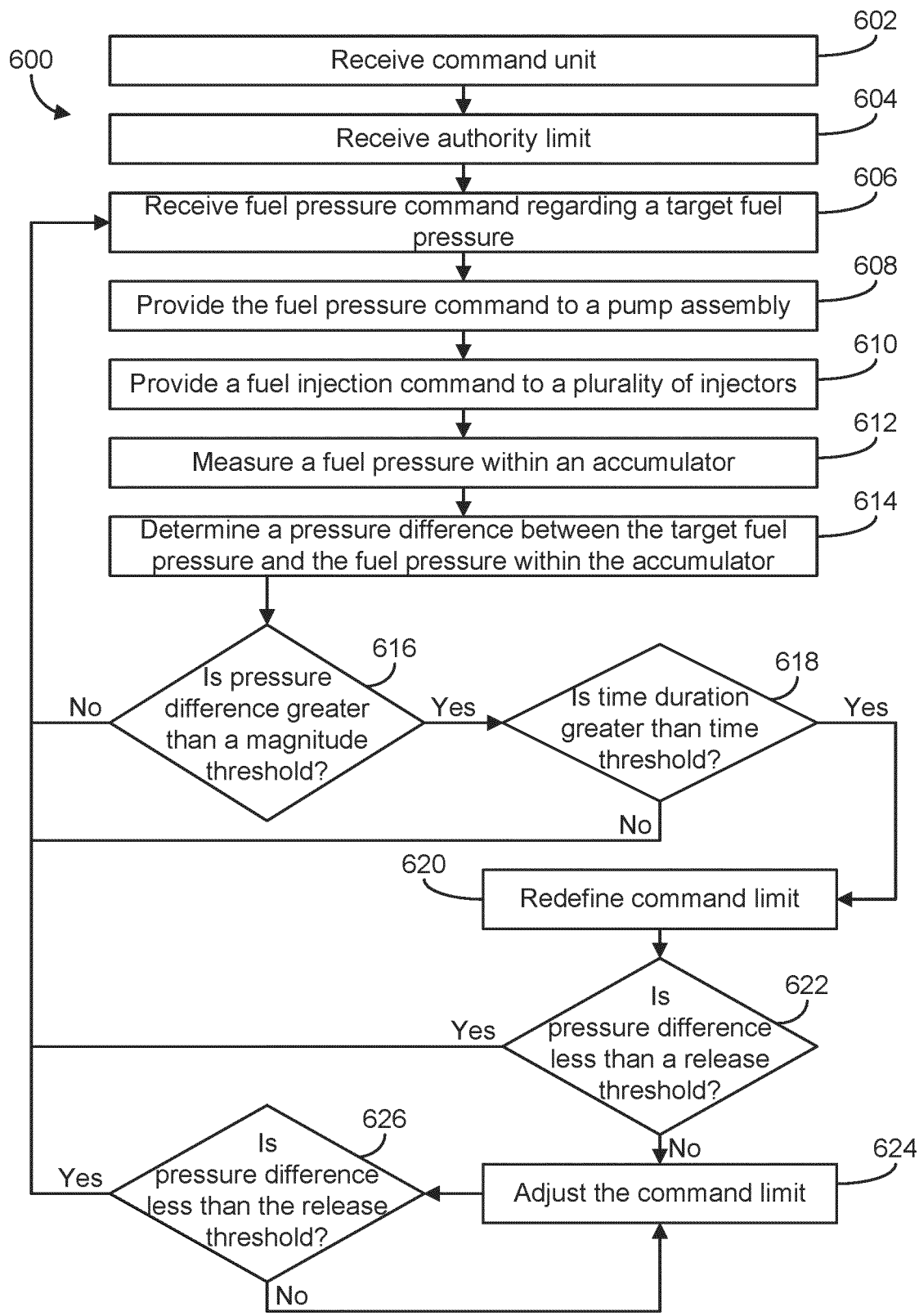
FIG. 6 is a flow diagram of a method of fuel pressure control for a fuel system, according to an example embodiment.

Referring now to FIG. 6, a method 600 for controlling fuel pressure within a fuel system is shown according to an example embodiment. Method 600 corresponds with the controller 150 interpreting the position data 170 and the pressure data 172 to modulate at least one of a fuel flow through the HPP assembly 130 and a fuel injection through the fuel injectors 138. In some embodiments, method 600 may be implemented with the controller 150 of FIGS. 1-3 and described in relation thereto.

At process 602, the controller 150 receives a command limit for the operation of an engine (e.g., the engine 112, etc.) and/or a fuel system (e.g., the fuel system 122, etc.). The command limit may be predefined within the controller 150 or entered via an input device (e.g., the operator I/O device 190, etc.). As described above, the command limit may include at least one of a maximum fuel injection duration, a maximum amount of fuel injected into a cylinder of the engine, a maximum fuel flow rate through injectors, a maximum output power of the engine, and a maximum output torque of the engine. At process 604, the controller 150 receives an authority limit for the operation of the engine and/or the fuel system. The authority limit may be predefined within the controller 150 or entered via the input device. As described above, the authority limit may include at least one of a minimum fuel injection duration, a minimum amount of fuel injected into a cylinder of the engine, a minimum fuel flow rate through injectors, a minimum output power of the engine, and a minimum output torque of the engine.

At process 606, the controller 150 receives a fuel pressure command regarding a target fuel pressure. For example, the input device may include an accelerator pedal or throttle where the position of the input device measured by a position sensor (e.g., the position data 170, etc.) corresponds with the fuel pressure command. Therefore, an operator may provide the controller 150 with the fuel pressure command (e.g., to operate the engine at desired performance levels such as engine speed, engine power, engine torque, etc.) based on the input to the input device. At process 608, the controller 150 provides the fuel pressure command to a pump assembly (e.g., the HPP assembly 130, etc.). Next, the pump assembly is configured to provide a fuel flow to an accumulator (e.g., the accumulator 136, etc.) at the target pressure based on the fuel pressure command. At process 610, the controller provides a fuel injection command to a plurality of injectors (e.g., the plurality of fuel injectors 138, etc.). The fuel injection command may include an injection characteristic for the fuel to be injected into the cylinders of the engine based on the fuel pressure command (i.e., the engine performance characteristics desired by the operator based on the position of the accelerator pedal/throttle, etc.). The injection characteristic may include at least one of a fuel flow rate, a fuel injection duration, and an injected amount of fuel into the cylinders of the engine.

At process 612, a pressure transducer (e.g., the pressure sensor 142, etc.) measures a fuel pressure of the fuel flow within the accumulator. At process 614, the controller 150 determines a pressure difference/error between the target fuel pressure and the fuel pressure within the accumulator. At process 616, the controller 150 determines whether the pressure difference is greater than a magnitude threshold (e.g., 250 bar, 300 bar, etc.). The controller 150 repeats processes 608 to 616 for a pressure difference less than the magnitude threshold. The controller 150 determines whether the magnitude threshold is exceeded for a duration of time (e.g., 3 minutes, 4 minutes, etc.) greater than a time threshold when the pressure difference is greater than the magnitude threshold (process 618). In some embodiments, the controller 150 repeats processes 606 to 618 if the time threshold is not exceeded. The controller 150 may redefine the command limit if the time threshold is exceeded (process 620). In one embodiment, the command limit is redefined to a fraction (e.g., 90%, 75%, etc.) of a last fuel injection command that facilitated a pressure difference less than the magnitude threshold. In some embodiments, the command limit is redefined using a higher order function or look-up table based on the last fuel injection command that facilitated a pressure difference less than the magnitude threshold At process 622, the controller 150 determines whether redefining the command limit reduced the pressure difference below a respite threshold. As described above, the respite threshold may comprise a maximum pressure difference that the pressure difference must not exceed for a period of time before the controller 150 maintains the redefined command limit constant. The respite threshold may be less than or equal to the magnitude threshold. The controller 150 maintains the command limit constant at the redefined parameter and repeats processes 606 to 616 if redefining the command limit would reduce the pressure difference below the respite threshold. The controller 150 adaptively adjusts the command limit if the pressure difference is not reduced below the respite threshold (process 624). In one embodiment, the control method is a single direction integral type control method. At process 626, the controller 150 determines whether the controller has reduced the pressure difference below the respite threshold. The controller 150 keeps the command limit constant at the redefined parameter as determined by the control method and repeats processes 606 to 616 if the reduced pressure difference drops below the respite threshold. Otherwise, the controller 150 may continually adjust the pressure difference until at least one of the pressure difference is less than the respite threshold or the command limit reaches the authority limit.

In an alternate embodiment, process 624 or process 620 is re-implemented if the respite threshold is exceeded after the pressure difference is reduced below the respite threshold (e.g., instead of waiting for the pressure difference to exceed the magnitude threshold and the time threshold as shown in method 600, etc.). In some embodiments, the process 624 or process 620 is re-implemented if the magnitude threshold is exceeded after the pressure difference is reduced below the respite threshold without determining whether the time threshold is exceeded (process 618).

Figure 7:
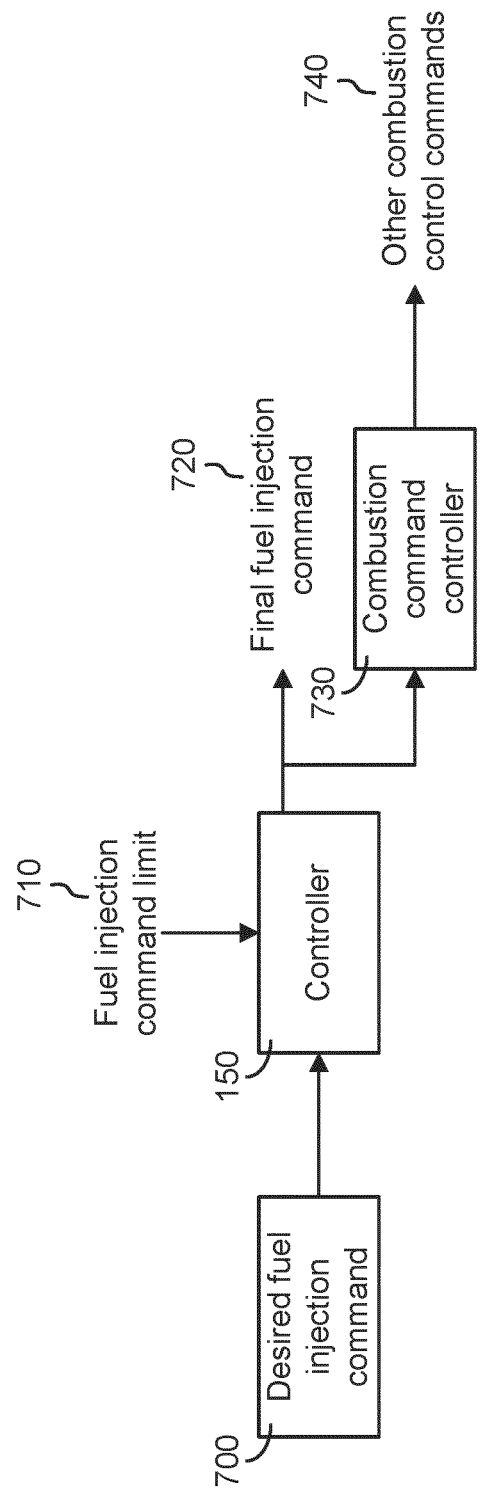
FIG. 7 is a schematic diagram of a control system for a fuel injection command limit, according to an example embodiment.

Referring now to FIG. 7, a schematic diagram of a control system for a fuel injection command limit 710 is shown according to an example embodiment. Another aspect to consider when modulating the fuel injection commands to the fuel injectors 138 is the effect that such modulation has on other combustion control commands 740. Other combustion control commands 740 may include, but are not limited to, parameters such as fuel injection timing and control of the exhaust gas recirculation system, among other commands. In some approaches, the fuel injection command limit 710 is implemented downstream of a portion of the control system (e.g., combustion command controller 730, etc.) that determines the other combustion commands 710. The issue with such an arrangement is that other combustion control commands 740 are not determined based on the final fuel injection command 720 that determines the electrical signals sent to the fuel injectors 138 to modulate the injection characteristics (e.g., a fuel flow rate, a fuel injection duration, and an injected amount of fuel, etc.). As a result, the fuel system 122 operates using combustion controls that are not matched or modified by the fuel injection command limit 710. This gives rise to situations where the desired fuel injection command 700 may be, for example, 100 milligrams per stroke and the controller 150 reduces the fuel injection command to a final fuel injection command 720 of 50 milligrams per stroke. With the determination of the other combustion commands 740 being upstream of the fuel injection control, other engine systems operate under the initial conditions (e.g., 100 milligrams per stroke, the desired fuel injection command limit 700, etc.). For example, in some embodiments, an EGR fraction and timing may be consistent with the 100 milligrams per stroke rather than 50 milligrams per stroke. Therefore, the other combustion commands 740 may operate based on operational parameters that are not actually being implemented.

In the fuel system 122 of the present disclosure, the control system may be arranged such that the other combustion control commands 740 are made after the final fuel injection command 720 is applied by controller 150. As shown in FIG. 7, the controller 150 receives a desired fuel injection command 700 (e.g., based on fuel pressure command, etc.). In one embodiment, the controller 150 provides a final fuel injection command 720 to the fuel injectors 138 equivalent or substantially equivalent to the desired fuel injection command 700 while the pressure difference between the target fuel pressure and the actual fuel pressure is less than the magnitude threshold. Once the fuel pressure difference exceeds the magnitude threshold, the controller 150 may apply a fuel injection command limit 710, effectively changing the final fuel injection command 720. The final fuel injection command 720 may reduce the pressure difference below the magnitude threshold (as described above). With the final fuel injection command 720 determination positioned upstream of a combustion command controller 730, the combustion command controller 730 may effectively control the other combustion commands 740 based on the final fuel injection command 720, and not merely based on the desired fuel injection command 700. In this way, the other combustion control commands 740 are consistent with the final fuel injection command 720.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
an injector circuit structured to control a plurality of fuel injectors to inject fuel into an engine based on a target fuel injection characteristic;
a pump circuit structured to determine an operating condition of an inlet metering valve (IMV) of a pressure pump assembly structured to provide fuel to the plurality of fuel injectors; and
a modulation circuit structured to modulate a final fuel injection command responsive to the operating condition of the IMV, wherein the final fuel injection command is based on the operating condition of the IMV and the target fuel injection characteristic.

2. The apparatus of claim 1, wherein the operating condition of the IMV is a saturation condition in which the IMV is at a full operating condition for a time that exceeds a time threshold.

3. The apparatus of claim 1, wherein the pump circuit is structured to determine the operating condition of the IMV based on a pump command sent to the IMV, wherein the pump command includes one or more of a position of the IMV and a time duration corresponding to the position of the IMV.

4. The apparatus of claim 1, wherein the modulation circuit is further structured to determine a final fuel injection command limit defining a maximum threshold value for the final fuel injection command based on the operating condition of the IMV.

5. The apparatus of claim 4, wherein the maximum threshold value and the target fuel injection characteristic are at least one of a fuel injection duration, an amount of fuel injected, a fuel flow rate through the plurality of fuel injectors, an engine power, and an engine torque.

6. The apparatus of claim 5, wherein the final fuel injection command limit is maintained above an authority limit and the modulation circuit is further structured to determine that a release condition is met when the final fuel injection command drops a threshold amount below the authority limit.

7. The apparatus of claim 1, wherein the final fuel injection command is further based on a target fuel pressure, and wherein the target fuel pressure is based on a fuel pressure command based on a position of at least one of an accelerator pedal and a throttle.

8. A method, comprising:
controlling, by a controller, a pump assembly to provide fuel to a plurality of fuel injectors, wherein controlling the pump assembly includes positioning an inlet metering valve (IMV) of the pump assembly;
controlling, by the controller, the plurality of fuel injectors to inject fuel into an engine based on a target fuel injection characteristic;
determining, by the controller, an operating condition of the IMV; and
modulating, by the controller, a final fuel injection command responsive to the operating condition of the IMV.

9. The method of claim 8, wherein the operating condition of the IMV is a saturation condition in which the IMV is at a full operating condition for a time that exceeds a time threshold.

10. The method of claim 8, wherein the operating condition of the IMV is determined based on a pump command sent to the IMV, wherein the pump command includes one or more of a position of the IMV and a time duration corresponding to the position of the IMV.

11. The method of claim 8, further comprising determining, by the controller, a final fuel injection command limit defining a maximum threshold value for the final fuel injection command based on the operating condition of the IMV.

12. The method of claim 11, wherein the maximum threshold value and the target fuel injection characteristic are at least one of a fuel injection duration, an amount of fuel injected, a fuel flow rate through the plurality of fuel injectors, an engine power, and an engine torque.

13. The method of claim 12, wherein the final fuel injection command limit is maintained above an authority limit and the controller is further structured to determine that a release condition is met when the final fuel injection command drops a threshold amount below the authority limit.

14. The method of claim 8, wherein the final fuel injection command is further based on a target fuel pressure based on a fuel pressure command based on a position of at least one of an accelerator pedal and a throttle, and wherein the position is determined by a position sensor.

15. A system, comprising:
a controller communicably coupled to a pump assembly including an inlet metering valve (IMV) structured to provide fuel to a plurality of fuel injectors, the controller structured to:
control the plurality of fuel injectors to inject fuel into an engine based on a target fuel injection characteristic;
determine an operating condition of the IMV; and
determine a final fuel injection command based on the operating condition of the IMV, wherein the final fuel injection command is based on the operating condition of the IMV and the target fuel injection characteristic.

16. The system of claim 15, wherein the operating condition of the IMV is a saturation condition in which the IMV is at a full operating condition for a time that exceeds a time threshold.

17. The system of claim 15, wherein the controller is structured to determine the operating condition of the IMV based on a pump command sent to the IMV, wherein the pump command includes one or more of a position of the IMV and a time duration corresponding to the position of the IMV.

18. The system of claim 15, wherein the controller is further structured to determine a final fuel injection command limit defining a maximum threshold value for the final fuel injection command based on the operating condition of the IMV.

19. The system of claim 18, wherein the maximum threshold value and the target fuel injection characteristic are at least one of a fuel injection duration, an amount of fuel injected, a fuel flow rate through the plurality of fuel injectors, an engine power, and an engine torque.

20. The system of claim 15, wherein the final fuel injection command is further based on a target fuel pressure based on a fuel pressure command based on a position of at least one of an accelerator pedal and a throttle, and wherein the position is determined by a position sensor.

* * * * *